(12) United States Patent
Kevern et al.

(10) Patent No.: US 8,517,613 B2
(45) Date of Patent: Aug. 27, 2013

(54) MODULAR OPTICAL CONNECTOR APPARATUS AND METHOD

(75) Inventors: James David Kevern, Annapolis, MD (US); Edmund Joseph Haley, Dillsburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 356 days.

(21) Appl. No.: 12/856,051

(22) Filed: Aug. 13, 2010

(65) Prior Publication Data

US 2012/0039569 A1 Feb. 16, 2012

(51) Int. Cl.
*G02B 6/38* (2006.01)
(52) U.S. Cl.
USPC .......................................................... 385/56
(58) Field of Classification Search
None
See application file for complete search history.

(56) References Cited

U.S. PATENT DOCUMENTS

| | | | |
|---|---|---|---|
| 5,333,222 A * | 7/1994 | Belenkiy et al. | 385/70 |
| 5,923,805 A * | 7/1999 | Anderson et al. | 385/86 |
| 6,357,930 B1 * | 3/2002 | Wiltjer | 385/60 |
| 6,461,053 B1 * | 10/2002 | Mayercik et al. | 385/56 |
| 6,568,861 B2 * | 5/2003 | Benner et al. | 385/55 |
| 2005/0084215 A1 * | 4/2005 | Grzegorzewska et al. | 385/60 |

OTHER PUBLICATIONS

Tyco Electronics Catalog 1307895; Lightray MPX Backplane Solutions, pp. 18-25; Apr. 2010.
Molex Fiber Optics Division literature, MBMT MT High Density Backplane Interconnect System; Jul. 2002.
ITT Corporation Solutions: Cannon, VEAM & BIW Connectors; retrieved from the internet on Oct. 5, 2010 [[http://www.ittcannon.com/product.aspx?id=1928]]; Publication date unknown.

* cited by examiner

*Primary Examiner* — Tina Wong (57) ABSTRACT

The invention pertains to a modular optical connection system that permits simple swapping of optical connectors of different form factor types. Furthermore, it allows a single optical connector design of a given form factor to be used to make optical connectors in various different board-to-board configurations, such as orthogonal, coplanar, and backplane. In accordance with the invention, an outer housing is mounted on a board which housing allows two inner housings to mate with each other through the outer housing. A single outer housing can be used with different inner housings adapted to accept various different connector form factors therein and permits the two mating inner housings to float longitudinally within the outer housing. It also allows the two mating inner housings to engage and disengage via simple push engagement and pull disengagement. The external dimensions and features of all of the different connector housings are essentially identical to each other so that they all can mate with each other and with the outer housing, but have different internal dimensions and features depending on the particular connector form factor style for which they are designed.

20 Claims, 5 Drawing Sheets

MODULAR OPTICAL CONNECTOR APPARATUS AND METHOD

FIELD OF TECHNOLOGY

The invention pertains to optoelectronics. More particularly, the invention pertains to a method and apparatus for coupling optical connectors to each other.

BACKGROUND

Optical connectors are used to connect optical signals between two optical components, such as between two optical fibers, between an optical fiber and a piece of optical or optoelectronic equipment, or between two pieces of optical or optoelectronic equipment. Due to its many advantages, optical fibers and other optical transports, such as optical waveguides, are increasingly being used to transport signals within individual pieces of electronic equipment, such as computers, cellular telephones, televisions, etc. Accordingly, optical connections must be made across printed circuit boards that are movable relative to each other. For instance, a removable daughter card, such as a PCMCIA card might mate to a motherboard through the back panel of a personal computer. There are several different relative orientations in which two PCB boards (or cards) may mate, including coplanar, orthogonal, and conventional backplane, each having a different relative orientation between the two mating PCBs.

Furthermore, there are many different styles of optical connectors. Merely a few of the well-known standard optical connector styles are LC, MT, MPO, SC, and ST. Each connector style has its own form factor and can be mated only to another connector of the same style.

As data rates and bandwidths in electronic devices continue to increase, it sometimes is the case that a manufacturer of an electronic device wishes to upgrade the type of optical connector style used in a card without having to replace the entire card. For example, an LC connector can have up to four optical transports in it. If a daughter card, such as a PCMCIA card for a personal computer was originally designed to mate with a backplane using LC connectors, the manufacturer eventually may be interested in upgrading the optical couplings from LC style connectors to MT style connectors, which can support up to 72 fibers per connector, in order to increase the bandwidth of the data transfer between the motherboard and the daughter card.

Typically, this requires a complete redesign of both the mother board and the daughter card.

SUMMARY

The invention pertains to a modular optical connection system that permits simple swapping of optical connectors of different form factor types. Furthermore, it allows a single optical connector design of a given form factor to be used to make optical connectors in various different board-to-board configurations, such as orthogonal, coplanar, and backplane. In accordance with the invention, an outer housing is mounted on a board which housing allows two connector housings to mate with each other through the outer housing. A single outer housing can be used with different connector housings adapted to accept various different connector form factors therein and permits the two mating connector housings to float longitudinally within the outer housing. It also allows the two mating connector housings to engage and disengage via simple push engagement and pull disengagement. The dimensions and features of all of the different connector housings for engaging the outer housing are essentially identical to each other so that they all can mate with each other and with the outer housing, but have different internal dimensions and features for receiving the optical connectors depending on the particular connector form factor style for which they are designed.

The outer housing is affixed to one of the boards (e.g., the motherboard). The connector housing associated with that board and the optical connector(s) contained within it are not affixed to that board, except through the outer housing. The connector housing associated with the other board (e.g., the daughter card) typically would be affixed to that board but the actual optical connectors on that card are not affixed to that card, except through its connector housing. Thus, the optical connector form factor style of the optical connection can be easily swapped by pulling out the connector housings associated with the two boards and replacing them with other connector housings adapted to a different form factor optical connector style

DETAILED DESCRIPTION OF EMBODIMENTS

Figure 1:
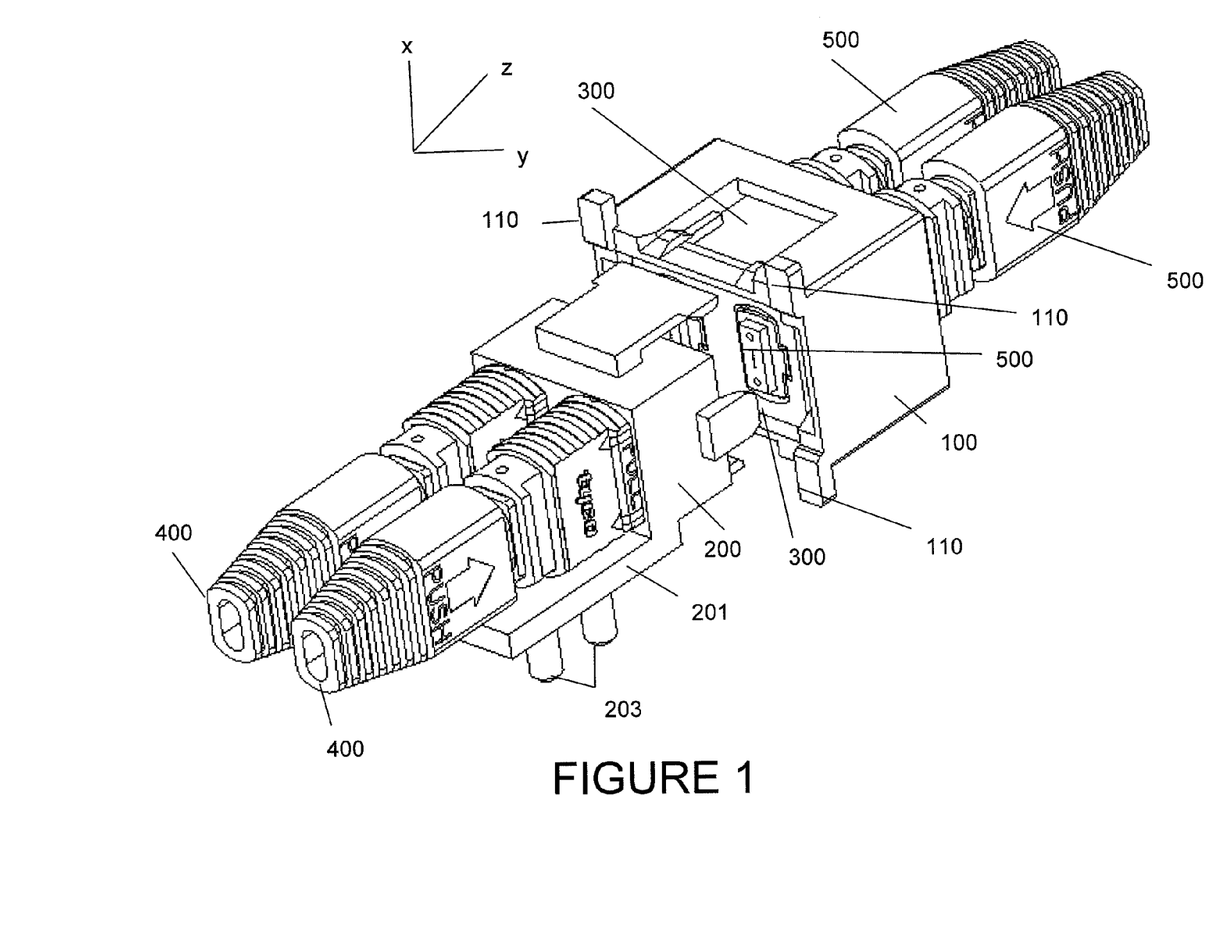
FIG. 1 illustrates the components of an optical connector in accordance with the principles of an embodiment of the invention.

FIG. 1 illustrates the components involved in an optical connection system in accordance with the principles of the present invention. There are essentially five relevant components. They are an outer connection housing 100, two inner connection housings 200 and 300, and two optical connectors 400 and 500. The optical connectors can be any style, such as LC, MT, MPO, SC, ST, etc. MPO connectors are illustrated in FIG. 1. The optical connectors, of course, must match, e.g., an LC connector and an LC connector or an MPO connector to an MPO connector.

The optical connectors 400 and 500 fit within the connector housings 200 and 300 respectively. As illustrated, the connector housings 200, 300 may be adapted to accept multiple ones of the optical connectors 400, 500. For instance, in the embodiment illustrated in FIG. 1, the connector housings 200 and 300 are each adapted to accept up to two MPO connectors. The connector mounting features and dimensions of the connector housings 200, 300 are adapted to accept a particular style of connector, e.g., an MT connector or an LC connector. Accordingly, different connector housings 200, 300 are provided for each style of optical connector intended to be supported by the inventive system. In fact, for connector styles that are male/female, there may need to be a different connector housing design for the male connector version and the female connector version. The connector mounting features and dimensions typically, but not necessarily will all be internal to the connector housing 200, 300. Accordingly, the connector mounting features may sometimes be referred to herein as internal features for simplicity. But it should be understood that this is not meant to imply that all connector mounting features for all styles of connectors are necessarily inside of the connector housing. The connector housings 200, 300 are adapted to accept one or more connectors of the particular style to which they are adapted preferably in a manner that latches the respective connectors in the connector housings, but also permits the two mating optical connectors to latch to each other in their usual manner in accordance with the in particular form factor style.

While the internal dimensions and features of the connector housings 200, 300 differ for each type of form factor, the features and dimensions for engaging the connector housings to the outer housing and/or to each other for all of the different types of connector housings 200, 300 are essentially identical and are adapted to mate and latch to each other through the outer housing 100 and to the outer housing as will be described in detail herein below. These features and dimensions typically (and in the illustrated embodiment) are on or extend from the outside or external surfaces of the connector housing 200, 300. Accordingly, the features for mounting the connector housings 200, 300 to the outer housing 100 may sometimes be referred to herein as external features for simplicity. But it should be understood that this is not meant to imply that all features for mounting the connector housings 200, 300 to the outer housing 100 in all possible physical embodiments of the connector housings necessarily need be on the outside of the connector housing.

The outer housing 100 is designed to accept the two connector housings 200, 300 therethrough (with each of the connector housings containing one or more optical connectors 400, 500 therein).

The outer housing 100 traps the two connector housings 200, 300 therein, but while permitting longitudinal float. Longitudinal float is desirable to accommodate for backplane system tolerances which may not be very well controlled. Accordingly, there is a range of distances in the longitudinal direction at which the optical connector on, for example, a daughter card might sit relative to a backplane. Thus, the optical connection mechanism should allow the connector on the backplane to float longitudinally to accommodate for possible variations in the panel mounting of the card. A typical tolerance range for a panel mounting might be approximately 2 millimeters. Hence, the optical coupling preferably can float longitudinally within the outer housing over at least that range.

There also may be several different versions of the outer housing 100. However, the different versions of the outer housing has nothing to do with the style of optical connectors to be connected there through, but rather with the orientation of the two boards across which the optical coupling is being made. More particularly, the only difference between the various versions of the outer housing would be the mounting mechanism for mounting the outer housing to a board or other surface. FIG. 1 illustrates an outer housing that is adapted for backplane mounting, i.e., the mounting flanges extend parallel to the front face of the outer housing Accordingly it has four mounting flanges 110 (only three are seen in the view of FIG. 1) extending laterally from the four corners of the front face of the housing so that it can be mounted to a board with the front face parallel to and substantially flush with the board (see connection 30 in FIG. 2, which illustrates a conventional backplane type engagement between a vertical backplane 14 and a horizontal card 13).

However, other types of board-to-board orientations, such as coplanar (such as illustrated by connections 10 and 20 in FIG. 2) or orthogonal (such as connection 40 in FIG. 2) may require differently oriented mounting flanges. Thus, the different outer housings 100 may differ from each other with respect to the mounting flanges, but may otherwise be identical to each other.

As will be discussed further in connection with FIG. 2, however, it also is possible to design an outer housing 100 that includes multiple mounting flanges (or multiple sets of mounting flanges) to permit a single outer housing style to be mounted in two or more of the various possible board-to-board environments simply by selecting one of the mounting flanges (or sets of mounting flanges) for use and not using the other(s).

The connector housing associated with the board on which the outer housing 100 is mounted (this would be connector housing 300 in the example of FIG. 1 and will be referred to as the unmounted connector housing when it is necessary to distinguish between the two connector housings 200, 300) is attached to that board only through the outer housing 100. The other connector housing (connector housing 200 in the example of FIG. 1) typically would be affixed to its board (or other mounting surface) through a mounting mechanism, such as mounting pins 203 on mounting flange 201 illustrated in FIG. 1 (and will hereinafter be referred to as the board-mounted connector housing when it is necessary to distinguish between the two connector housings 200, 300).

The system employing an outer housing 100 that mounts to one of the mating boards and swappable connector housings 200, 300 that can be placed within the outer housing 100 simplifies the process of upgrading optical connectors on a mother board because the outer housing is the only thing permanently attached to the mother board. Thus, for instance, if it is desired to change the form factor style of the optical connectors on a mother board for use with a new daughter board, the optical connector(s) 500 and unmounted connector housing 300 of the mother board can simply be unlatched from the outer housing 100, removed, and replaced with new optical connector(s) 500 and corresponding unmounted connector housing 300. In fact, if the optical connector swap involves new optical connectors of the same form factor style as the old optical connectors (e.g., replacing a faulty connector), then the unmounted connector housing 300 does not even need to be removed. Only the connector(s) 500 need be unlatched from the unmounted connector housing 300 and replaced with new connector(s) 500.

Figure 2:
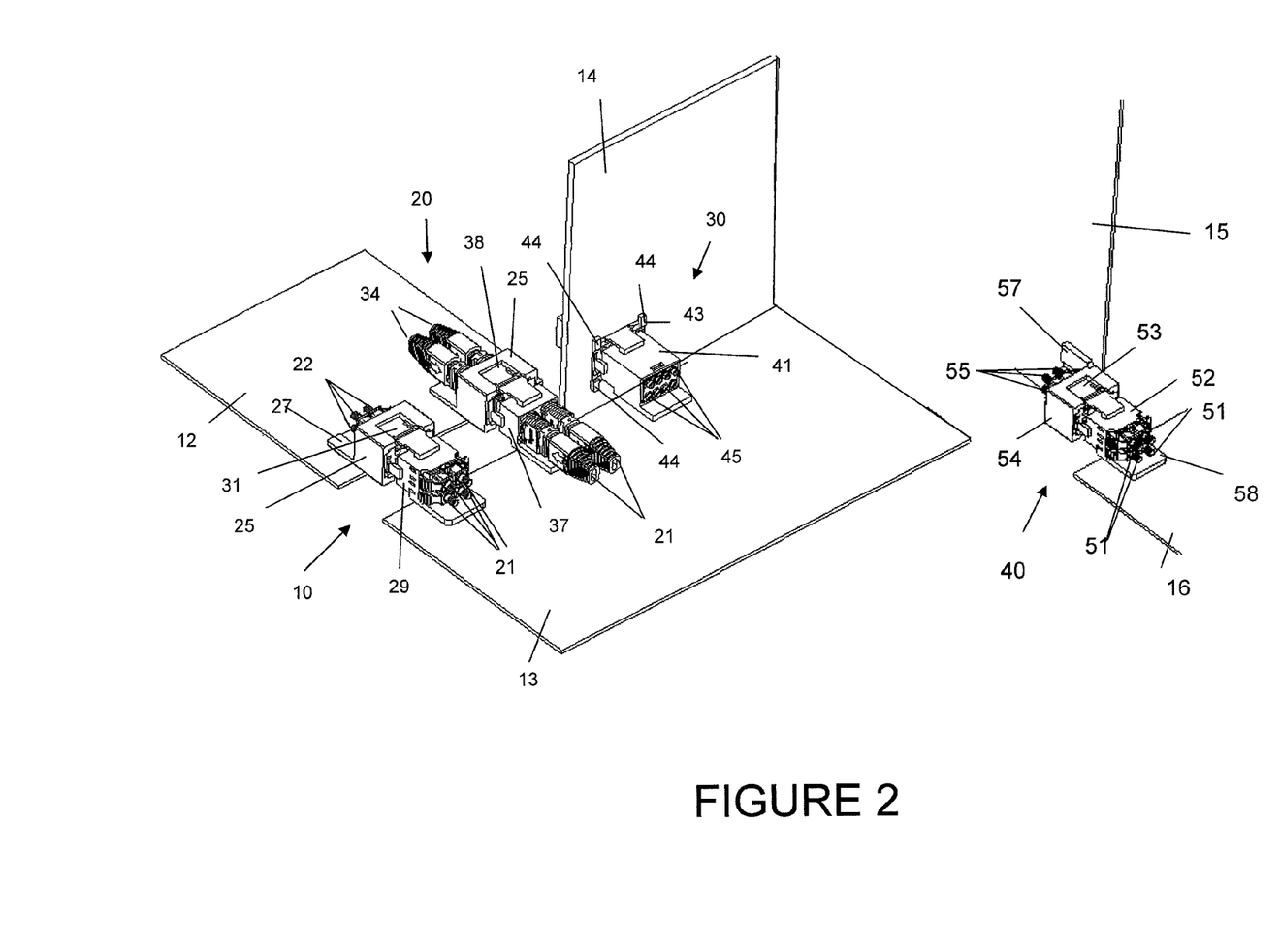
FIG. 2 illustrates connectors in accordance with the present invention used in various board-to-board coupling environments.

FIG. 2 illustrates four different optical connections 10, 20, 30, and 40 illustrating merely a few permutations of the types of optical connections possible made using the principles of the present invention, including the different optical connector form factor styles and board-to-board orientations. Particularly, connection 10 illustrates a set of four LC connectors 21 on board 13 connecting to four LC connectors 22 on coplanar board 12 (note that not necessarily all of the connectors 21, 22 are visible from this perspective). The outer housing 25 is attached to the board 12 by mounting flange 27. The LC connectors 21 on board 13 are contained in a board-mounted connector housing 29 specifically adapted to accept up to four LC connectors 21. The four LC connectors 22 on board 12 are contained in an unmounted connector housing 31 the internal features and dimensions of which are adapted to accept and latch up to four LC connectors 22. Depending on whether the signals transported through the optical connection terminate on one of the boards 12 or 13 or simply pass through, this may be a midplane connection or a backplane connection.

Second exemplary connection 20 also shows a coplanar connection (which also may be considered a midplane or a backplane connection depending on the destination or source of the signals, except that the optical connectors are a pair of MPO connectors 33 and 34. Again, the MPO style optical connectors 33 are housed in a board-mounted connector housing 37 and mate with corresponding MPO style optical connectors 34 on the other board 12, which are housed within an unmounted connector housing 38. The two connector housings 37 and 38 mate through an outer housing 25 identical to outer housing 25 in first exemplary connection 10.

Third exemplary connection 30 demonstrates a conventional backplane connection between a horizontal board 13 and a vertical board 14. The optical connection is between eight LuxCis optical connectors 45 available from Tyco Electronics Corporation. The first set of eight connectors 45 are disposed in a board-mounted connector housing 41 mounted on horizontal board 13. They mate to eight corresponding LuxCis connectors (not seen) on the backside of vertical board 14 which are housed in an unmounted connector housing 43, of which only its mounting flanges 44 are visible through board 14 in FIG. 2. As in connections 10 and 20, the connector housings 41 and 42 are disposed within and connect through an outer housing 43. The outer housing 43 differs from the outer housings 25 of exemplary connections 10 and 20 in that it has different mounting flanges than outer housing 25 because it is to be surface mounted through a window in board 14, rather than top mounted on board 12. In fact, most of outer housing 43 is not visible in FIG. 2 because it is on the far side of vertical board 14. However, three of its four mounting flanges 44 for mounting it in the hole in vertical board 14 are visible.

Finally, exemplary optical connection shows an orthogonal connection between horizontal board 16 and orthogonal, vertical board 15. In exemplary connection 40, four MT connectors 51 are disposed within board-mounted connector housing 52 which mates to unmounted connector housing 53 mounted on orthogonal board 15 containing four more MT connectors 55. Outer housing 54 differs from outer housings 25 and 43 of exemplary connections 10, 20, and 30 only with respect to the mounting flange 57. Particularly, since this housing is adapted for use in an orthogonal board environment, its mounting flange 57 is a sideways flange.

Figure 3:
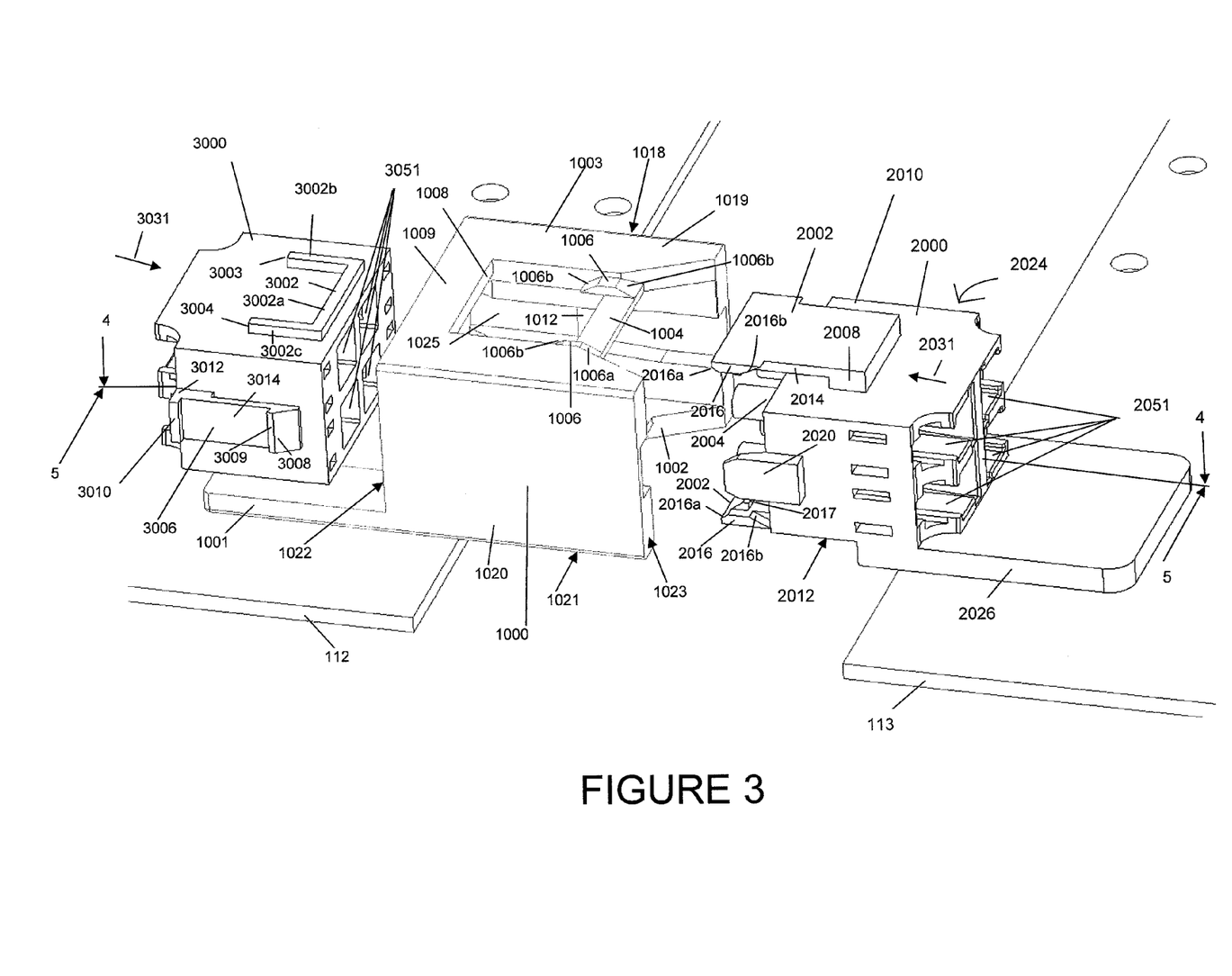
FIG. 3 is a perspective view of exemplary components of an optical connection system in accordance with the principles of an embodiment of the invention in an unassembled state.
Figure 4:
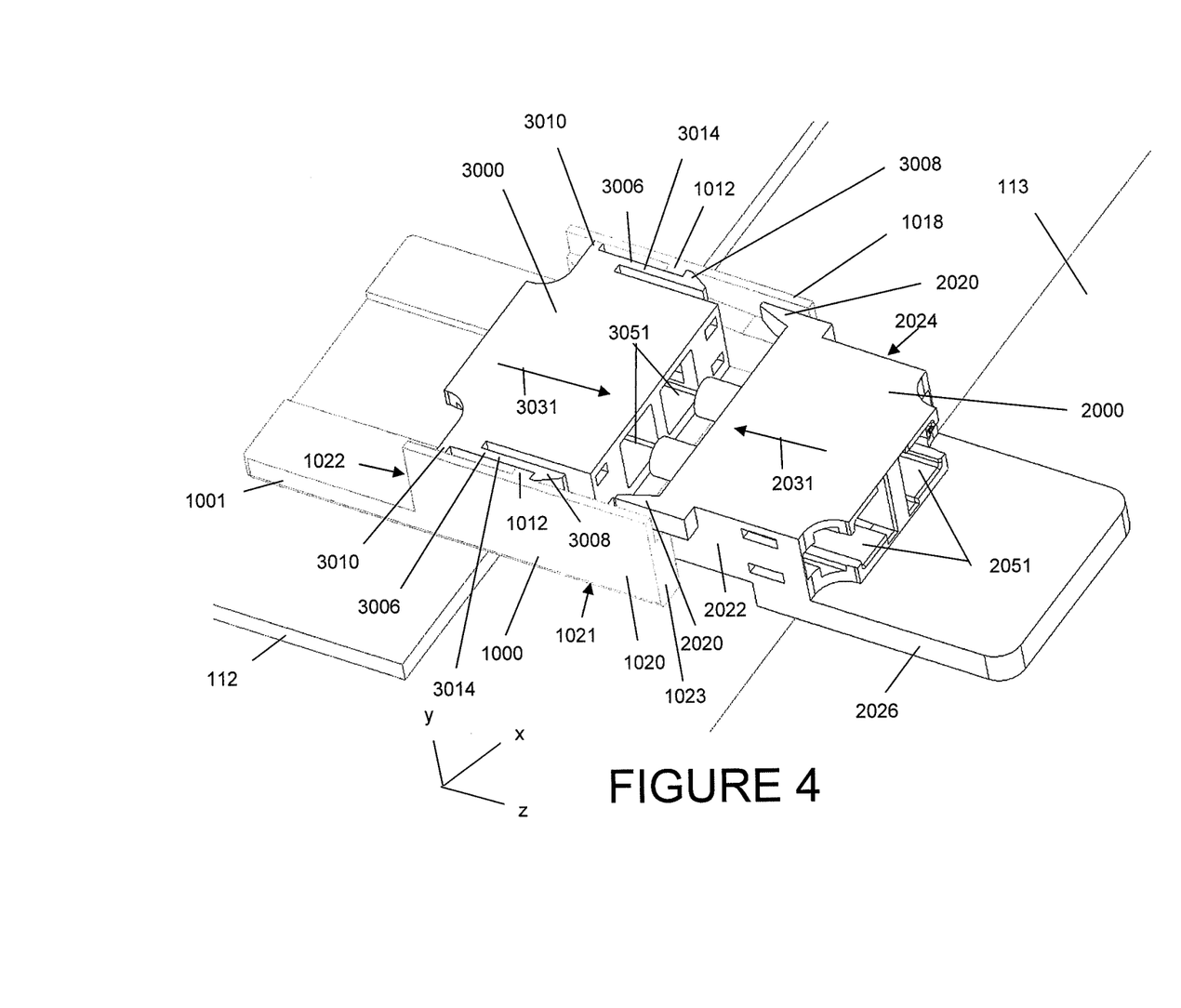
FIG. 4 is a sectional view through section 4-4 of FIG. 2 but showing the components in a partially assembled state.
Figure 5:
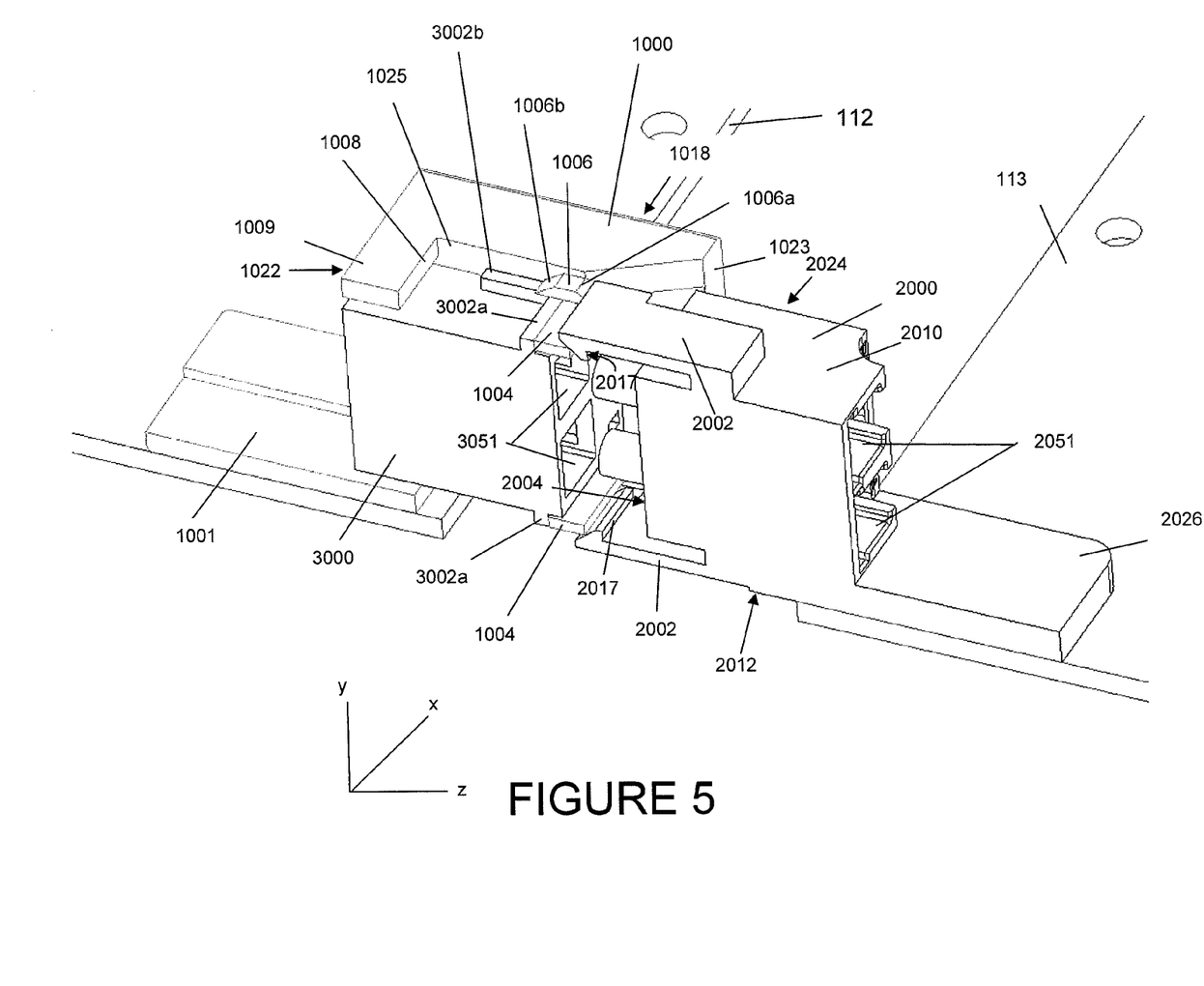
FIG. 5 is a sectional view through section 5-5 of FIG. 2 but showing the components in the same partially assembled state as in FIG. 4.

FIGS. 3, 4, and 5 show the details of the outer housing and the two connector housings and how they mate together and provide the aforementioned longitudinal float in accordance with one embodiment of the invention. Particularly, FIG. 3 is a perspective view of an outer housing 1000, an unmounted connector housing 3000, and a board-mounted connector housing 2000 in an unassembled state. FIG. 4 is a sectional view taken through line 4-4 of FIG. 3, except showing the connector housings 2000, 3000 and outer housing 1000 in a partially assembled state. Finally, FIG. 5 is a sectional view taken through line 5-5 in FIG. 3, except showing the components in the same partially assembled state as shown in FIG. 4.

Referring to FIGS. 3, 4, and 5, board-mounted connector housing 2000 mates with unmounted connector housing 3000 through outer housing 1000. The illustrated exemplary outer housing 1000 is specifically designed for a coplanar board-to-board environment as demonstrated by its mounting flange 1001. The outer housing 1000 is demonstrated mounted to a system card 112 via the mounting flange 1001. Exemplary connector housings 2000 and 3000 are particularly adapted to accept up to four LC form factor style connectors in bores 2051 and 3051, respectively, with board-mounted connector housing 2000 adapted to accept four LC connectors and unmounted connector housing 3000 is adapted to receive four LC connectors. As previously mentioned, the internal features and dimensions of the connector housings 2000 and 3000 should be designed to correspond to whatever style optical connectors they are designed to be used in conjunction with and forms no part of the invention. However, the external features and dimensions of the connector housings 2000 and 3000 will remain the same across different connector housings because all such connector housings will mate to each other and to the outer housing 1000.

The outer housing has two opposed end faces 1022 and 1023 and a side surface extending longitudinally between the two end faces 1022, 1023, the side surface comprising four side faces 1018, 1019, 1020, and 1021. The most relevant features of the outer housing 1000 to the coupling of the connector housings 2000, 3000 to it are cross bars 1004, ramp bodies 1006 (each comprising a forward ramp 1006a and a rearward ramp 1006b), and inner protrusions 1012. Although not necessarily visible in each of the FIGS. 3, 4, and 5, the outer housing 1000 has two of each of these features in opposing relation. Specifically, there are two protrusions 1012, one on each of the left and right side walls 1018 and 1020. There are two cross bars 1004, one running across the top of the outer housing 1000 and one running across the bottom. Finally, there are actually four ramp bodies 1006, namely, two at the opposite ends of and above top cross bar 1004 and two more at opposite ends of and below bottom cross bar 1004.

The most relevant features of unmounted connector housing 3000 are top and bottom ridges 3002 and right and left latches 3006. Ridges 3002 comprise a front ridge segment 3002a oriented running in the x dimension and two longitudinally rearwardly extending side segments 3002b and 3002c. Latches 3006 extend in the longitudinal direction from each of the sides of the unmounted connector housing 3000. Latch 3006 includes a base portion 3012 attached to the side of the unmounted connector housing at the rear of the housing, a lever arm 3014 extending forwardly therefrom, a wedge 3008 at the forward end of the lever arm 3014, and a flange 3010 extending laterally outwardly at the rear end of the latch 3006.

The most relevant features of board-mounted connector housing 2000 include two latches 2002 cantilevered from the top and bottom faces, respectively, of the board-mounted connector housing 2000 and extending forwardly of the front face 2004 of the board-mounted connector housing 2000. The latches 2002 include a base 2008 from which they are cantilevered from the top and bottom faces 2010 and 2012, respectively, of the board-mounted connector housing 2000, a lever arm 2014 and a wedge 2016 at the forward end of the lever arm 2014. Also, a wedge 2020 is cantilevered from each of the side faces 2022 and 2024 of the board-mounted connector housing 2000 and extends longitudinally forward of the front face 2004 of the board-mounted connector housing. In this exemplary embodiment, board-mounted connector housing 2000 is attached to a daughter board 113 via a mounting flange 2026.

Other significant features will be identified as needed in the following discussion.

Next will be described the process by which a board-mounted connector housing 2000 and an unmounted connector housing 3000 are coupled through an outer housing 1000 so as to provide optical coupling for the optical connectors disposed within those connector housings. In operation, the unmounted connector housing 3000 typically would be placed and patched into the outer housing 1000 first. However, either board-mounted connector housing 2000 or unmounted connector housing 3000 can be inserted into the outer housing 1000 first or they may be inserted simultaneously. In any event, assuming that female housing 3000 is slid into the outer housing 1000 first, unmounted connector housing 3000 is inserted into the outer housing in the longitudinal (z) direction until the ramp surfaces of wedges 3008 engage protrusions 1012 of the outer housing causing resilient latch arms 3014 of latches 3006 to flex inwardly to allow the ramp surfaces of wedges 3008 to ride up over protrusions 1012.

More particularly, the latches 3006 are designed to allow the surfaces of wedges 3008 to ride up over protrusions 1012 causing the lever arms 3014 to flex inwardly to allow the wedges 3008 to pass over and past protrusions 1012. When the wedges move past the forward edges of protrusions 1012, the arms 3014 snap back outwardly to their unflexed condition. At that point, the rear faces 3009 of the wedges 3008 will be in interference engagements with the forward edges of the protrusions 1012, thereby preventing the unmounted connector housing 3000 from being pulled back out of the outer housing 1000 unless and until the lever arms 3014 are flexed back inwardly to allow rear surfaces 3009 to clear protrusions 1012.

Flanges 3010 at the rear ends of latches 3006 extend laterally outwardly from the unmounted connector housing 3000 so that they will engage protrusions 1012 on the outer housing 1000 if unmounted connector housing is advanced forwardly far enough and will prevent the unmounted connector housing 3000 from being advance longitudinally forwardly past the point where flanges 3010 meet protrusions 1012. Accordingly, as can best be seen in FIG. 4, once the wedge 3008 clears the protrusion 1012, the unmounted connector housing 3000 is trapped within the outer housing 1000 within a limited range of longitudinal movement dictated by the distance between flange 3010 and the rear face 3009 of the wedge 3008, unless and until the lever arm 3014 is flexed inwardly again allowing the wedge 3008 to pass back over the protrusion 1012.

Shortly after the latches pass the protrusions 1012, front segments 3002a of ridges 3002 of unmounted connector housing 3000 will meet cross bars 1004 of outer housing 1000 (as best seen in FIG. 5), thereby preventing unmounted connector housing 3000 from advancing further forward into outer housing 1000.

With the unmounted connector housing 3000 thusly locked in the outer housing 1000, the board-mounted connector housing 2000 is then advanced longitudinally to the left in FIGS. 3, 4, and 5 to engage the unmounted connector housing 3000 and the outer housing 1000. Particularly, as the board-mounted connector housing 2000 is advanced longitudinally in the direction of arrow 2031 in FIG. 3, the front surfaces 2016a of wedges 2016 of latches 2002 engage forward ramps 1006a of ramp bodies 1006 causing the latches 2002 to flex outwardly. Then, as the board-mounted connector housing 2000 continues to advance in the direction of arrow 2031, the back surfaces 2016b of wedges 2016 ride back down the back ramps 1006b of ramp bodies 1006 of outer housing 1000 allowing latches 2002 to flex back inwardly until the latching surfaces 2017 (which are horizontally between the wedges 2016 at the ends of the latches 2002, as best seen in FIG. 5) engage front segments 3002a of ridges 3002 of unmounted connector housing 3000. At this point, board-mounted connector housing 2000 and unmounted connector housing 3000 are latched together by the mating of latches 2002 with segments 3002a of ridges 3002 of the unmounted connector housing 3000. Simultaneously with the above-described engagement of latches 2002 with ridges 3002, side extensions 2020 also engage latches 3006 on unmounted connector housing 3000. Particularly, extensions 2020 engage the surfaces of wedges 3008 causing latches 3006 to flex inwardly again, thereby freeing them from their interference fits with protrusions 1012 of the outer housing 1000. This frees unmounted connector housing 3000 from its longitudinally trapped condition in outer housing 1000. Rather, unmounted connector housing 3000 is now latched to board-mounted connector housing 2000 due to the mating of latch 2002 with ridge 3002, but simultaneously has become free of the outer housing 1000. Thus, the connected connector housings 200, 3000 can float longitudinally within outer housing 1000.

Also simultaneously with the engagement of the two connector housings 2000 and 3000, any optical connectors contained in those housings also engage according to the engagement mechanisms of their particular form factors. For most of the optical connectors discussed herein this is simply with the end faces of their respective optical fibers in contact and under slight compression.

If desired, the longitudinal movement of the assembled connector housings 2000 and 3000 can be restricted within a designated range. In the illustrated embodiment, for instance, longitudinal movement of the coupled connector housings 2000 and 3000 relative to the outer housing 1000 is not completely unrestricted. Longitudinal movement of the joined connector housings 2000 and 3000 is restricted by cross bar 1004 of outer housing 1000. Particularly, note that the base 2008 of latch 2002 of board-mounted connector housing 2000 will hit cross bar 1004 if the assembly is moved sufficiently far enough in the direction of arrow 2031. On the other hand, movement of the assembly in the opposite longitudinal direction (of arrow 3031) is restricted by the previously discussed engagement of ridge segment 3002a with cross bar 1004.

Nevertheless the two connector housing can still be disengaged from each other by simply pulling the board-mounted connector housing 2000 hard enough longitudinally in the direction of arrow 3031. Particularly, as just mentioned, forward progress of the unmounted connector housing 3000 will be stopped by cross bar 1004 meeting ridge segment 3002a. AT that point, wedge 2016 of latch 2002 of board-mounted connector housing 2000 will again engage ramp 1006b of ramp body 1006 of outer housing 1000. This will cause latch arm 2014 to flex outwardly, thereby disengaging wedge 2016 of board-mounted connector housing 2000 from ridge segment 3002a of unmounted connector housing 3000, thus unlatching the two connector housings 2000, 3000 from each other. Simultaneously, extensions 2020 will disengage from latches 3006, thereby allowing latches 3006 to flex back outwardly to the neutral position in which surfaces 3009 of wedges 3008 of latches 3006 will reengage with protrusions 1012 on the outer housing 1000.

Thus, unmounted connector housing 3000 will again become longitudinally trapped in outer housing 1000 as previously described. If it is desired to also disengage unmounted connector housing 3000 from outer housing 1000, a tool may be inserted to flex arms 3014 of latch 3006 inwardly so that the unmounted connector housing 3000 becomes unlatched from protrusions 1012 of outer housing 1000, at which point unmounted connector housing 3000 can be freely withdrawn from outer housing 1000.

Accordingly, engagement and disengagement of the two connector housings can be accomplished by simple push/pull operation. Furthermore, the optically coupled connector housings 2000 and 3000 can float freely in the longitudinal direction in outer housing 1000. Thus, connector styles can be swapped easily by simply switching the connector housings as needed for the particular style connector without changing the outer housing.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. An optical connection system comprising:
 a first connector housing comprising a first feature for releasably latching a first optical connector therein, a mounting mechanism for mounting the first connector housing to a surface, and a second feature for releasable latching the first connector housing to another housing;
 a second connector housing comprising a third feature for releasably latching a second optical connector therein, and a fourth feature for releasable latching the second connector housing to the first connector housing via engagement of the second feature and the fourth feature; and
 an outer housing including a mounting mechanism for mounting the outer housing to a surface, and further including a cavity bearing a fifth feature for receiving therein in a first longitudinal direction the first connector housing and receiving therein in an opposing longitudinal direction the second connector housing such that the first and second connector housings can releasably latch to each other such that optical connectors mounted in the first and second connector housings, respectively, would be in optical engagement with each other with the latched first and second connector housings able to move in the longitudinal direction within the outer housing.

2. The optical connection system of claim 1 wherein:
 the second feature comprises a first flexible latch having a base through which it is cantilevered from the first connector housing and a latching surface: and
 the fourth feature comprises a ridge for abutting the latching surface of the first latch of the first connector housing in latching engagement.

3. The optical connection system of claim 2 further comprising:
 a cross bar on the outer housing disposed to engage the ridge of the second connector housing so as to prevent longitudinal movement of the second connector housing in the first longitudinal direction past a first predetermined position and also to engage the first latch of the first connector housing so as to prevent longitudinal movement of the second connector housing in the second longitudinal direction past a second predetermined position, wherein, when the first and second connector housings are releasably latched to each other within the outer housing, they can move longitudinally a predetermined distance defined by the first predetermined position and the second predetermined position.

4. The optical connection system of claim 3 further comprising:
 a ramp disposed on the outer housing for engaging the latching surface of the first latch when the first connector housing is forcibly pulled out of the outer housing in the first longitudinal direction so as to convert a portion of the pulling force into a lateral force on the first latch to cause the latch surface to disengage from the ridge so as to unlatch the first connector housing from the second connector housing.

5. The optical connection system of claim 4 wherein the first latch comprises two latches, the ridge comprises two ridges, the crossbar comprises two crossbars, and the ramp comprises two ramps.

6. The connection system of claim 2 further comprising:
 a second latch disposed on the second connector housing comprising a base from which the second latch is cantilevered from the second connector housing and a latching surface; and
 a protrusion disposed on the outer housing for abutting the latching surface of the second latching mechanism in latching engagement so as to prevent movement of the second connector housing relative to the outer housing in the first longitudinal direction when the latching surface of the second latch is engaged with the protrusion.

7. The connection system of claim 6 further comprising:
 a flange extending from the second connector housing disposed so as to engage the protrusion on the outer housing and prevent longitudinal movement of the second connector housing within the outer housing in the second longitudinal direction when the flange engages the protrusion.

8. The connection system of claim 7 further comprising:
 a wedge extending from the first connector housing disposed to engage and unlatch the second latch of the second housing from the protrusion of the outer housing as the first connector housing is inserted in the first longitudinal direction into the outer housing and the first latch of the first connector housing latches the ridge of the second connector housing.

9. An optical connection system comprising:
 a plurality of first connector housings, each comprising a first feature for releasable latching the first housing to another housing, and a second feature for releasably latching a first optical connector therein, the first features of each of the first plurality of connector housings being the same for each of the first plurality of connector housings and the second features being different for each of the first plurality of connector housings, each different second feature adapted to releasably latch a different style of optical connector within the first connector housing;
 a plurality of second connector housings, each comprising a third feature for releasable latching the second connector housing to any of the plurality of first connector housings via engagement with the first feature of a one of the first plurality of connector housings, and a fourth feature for releasably latching a second optical connector therein, the third features of each of the second plurality of connector housings being the same for each of the second plurality of connector housings and the fourth features being different for each of the second plurality of connector housings, each different fourth feature adapted to releasably latch a different style of optical connector within the second connector housing; and
 an outer housing including a mounting mechanism for mounting the outer housing to a surface, and further including a longitudinal cavity bearing a fifth feature for receiving therein in a first longitudinal direction any one of the plurality of first connector housings and receiving therein in an opposing longitudinal direction any one of the plurality of second connector housings such that the first and second connector housings can releasably latch to each other such that optical connectors mounted in the first and second connector housings, respectively, would be in optical engagement with each other with the latched first and second connector housings able to move in the longitudinal direction within the outer housing.

10. The optical connection system of claim 9 wherein the outer housing comprises a plurality of outer housings, each one of the plurality of outer housings bearing a different mounting mechanism for mounting the outer housing to a surface in a different orientation.

11. The optical connection system of claim 10 wherein the plurality of outer housings comprises a first outer housing wherein the mounting mechanism is a mounting flange for orthogonal mounting of the outer housing to a surface, a second outer housing wherein the mounting mechanism is a mounting flange for coplanar mounting of the outer housing to a surface, and a third outer housing wherein the mounting mechanism is a mounting flange for backplane mounting of the outer housing to a surface.

12. The optical connection system of claim 11 wherein each of the plurality of outer housings comprises a first transverse end face at a first end of the longitudinal cavity and a second transverse end face at a second end of the longitudinal cavity and a side surface comprising at least first and second orthogonal side faces extending in the longitudinal direction between the first and second end faces, and wherein the mounting flange of the first outer housing is parallel to the first side face, the mounting flange of the second outer housing is parallel to the second side face, the mounting flange of the third outer housing is parallel to one of the first and second end faces.

13. The optical connection system of claim 9 wherein the second feature of each of the first plurality of connector housings comprises a plurality of second features for releasably latching a plurality of first optical connectors and the fourth feature of each of the second plurality of connector housings comprises a plurality of fourth features for releasably latching a plurality of second optical connectors.

14. The optical connection system of claim 9 wherein the pluralities of first and second connector housings each comprise housings for releasably latching LC, MT, and MPO style optical connectors.

15. The optical connection system of claim 10 wherein:
the first features each comprise a first flexible latch having a base through which it is cantilevered from the first connector housing and a latching surface: and
the third features each comprise a ridge for abutting the latching surface of the first latch of the first connector housing in latching engagement.

16. The optical connection system of claim 15 further comprising:
a cross bar on each outer housing disposed to engage the ridge of one of the second connector housings so as to prevent longitudinal movement of the second connector housing in the first longitudinal direction past a first predetermined position and also to engage the first latch of one of the first connector housings so as to prevent longitudinal movement of the second connector housing in the second longitudinal direction past a second predetermined position, wherein, when first and second connector housings are releasably latched to each other within the outer housing, they can move longitudinally a predetermined distance defined by the first predetermined position and the second predetermined position.

17. The optical connection system of claim 16 further comprising:
a ramp disposed on the outer housing for engaging the latching surface of the first latch when one of the first connector housings is forcibly pulled out of the outer housing in the first longitudinal direction so as to cause the latch surface to disengage from the ridge of one of the second connector housings, thereby unlatching the first connector housing from the second connector housing.

18. The optical connection system of claim 17 wherein the first latch comprises two latches, the ridge comprises two ridges, the crossbar comprises two crossbars, and the ramp comprises two ramps.

19. The connection system of claim 10 further comprising:
a second latch disposed on each second connector housing comprising a base from which the second latch is cantilevered from the second connector housing and a latching surface; and
a protrusion disposed on each outer housing for abutting the latching surface of the second latching mechanism of one of the second connector housings in latching engagement so as to prevent movement of the second connector housing relative to the outer housing in the first longitudinal direction when the latching surface of the second latch is engaged with the protrusion.

20. The connection system of claim 19 further comprising:
a wedge extending from the first connector housing disposed to engage and unlatch the second latch of the second housing from the protrusion of the outer housing as the first connector housing is inserted in the first longitudinal direction into the outer housing and the first latch of the first connector housing latches the ridge of the second connector housing.

* * * * *